United States Patent [19]

Coulon et al.

[11] 4,093,439

[45] June 6, 1978

[54] METHOD AND APPARATUS FOR MANUFACTURING GLASS RIBBON ON A BATH OF MOLTEN METAL

[75] Inventors: Jean-Claude Coulon, Chalon sur Saone, France; Piero Amannati, Pisa, Italy

[73] Assignee: Saint Gobain Industries, Neuilly-sur-Seine, France

[21] Appl. No.: 798,618

[22] Filed: May 19, 1977

[30] Foreign Application Priority Data

May 19, 1976 France .................................. 76 15049

[51] Int. Cl.² ............................................ C03B 18/02
[52] U.S. Cl. ........................................ 65/65; 65/99 A; 65/182 R
[58] Field of Search ................ 65/65 A, 99 A, 182 R

[56] References Cited

U.S. PATENT DOCUMENTS

| | | | |
|---|---|---|---|
| 3,409,423 | 11/1968 | De Lajarte | 65/99 A |
| 3,582,302 | 1/1971 | Kita et al. | 65/99 A |
| 3,627,492 | 12/1971 | Prislan | 65/182 R |
| 3,647,408 | 3/1972 | Dickenson | 65/99 A |
| 3,663,196 | 5/1972 | Dickenson | 65/99 A |
| 3,713,797 | 10/1970 | Lawrenson | 65/99 A |

FOREIGN PATENT DOCUMENTS

| | | |
|---|---|---|
| 2,015,506 | 4/1970 | France. |
| 2,015,505 | 4/1970 | France. |
| 1,578,738 | 7/1969 | France. |
| 1,362,013 | 4/1964 | France. |
| 2,055,259 | 6/1971 | Germany. |
| 1,230,480 | 5/1971 | United Kingdom. |

Primary Examiner—Arthur D. Kellogg
Attorney, Agent, or Firm—Pennie & Edmonds

[57] ABSTRACT

A method and apparatus are disclosed for manufacturing glass ribbon by pouring molten glass onto a bath of molten metal. As the glass ribbon advances along the length of the molten metal bath, the edges of the glass ribbon are simultaneously guided and cooled. Guide members positioned within the tank simultaneously guide the advancing glass ribbon by a thrust bearing and cool the edges of the glass ribbon by cooling means. The thrust bearing is separated from the cooling means by thermal insulating means.

15 Claims, 8 Drawing Figures

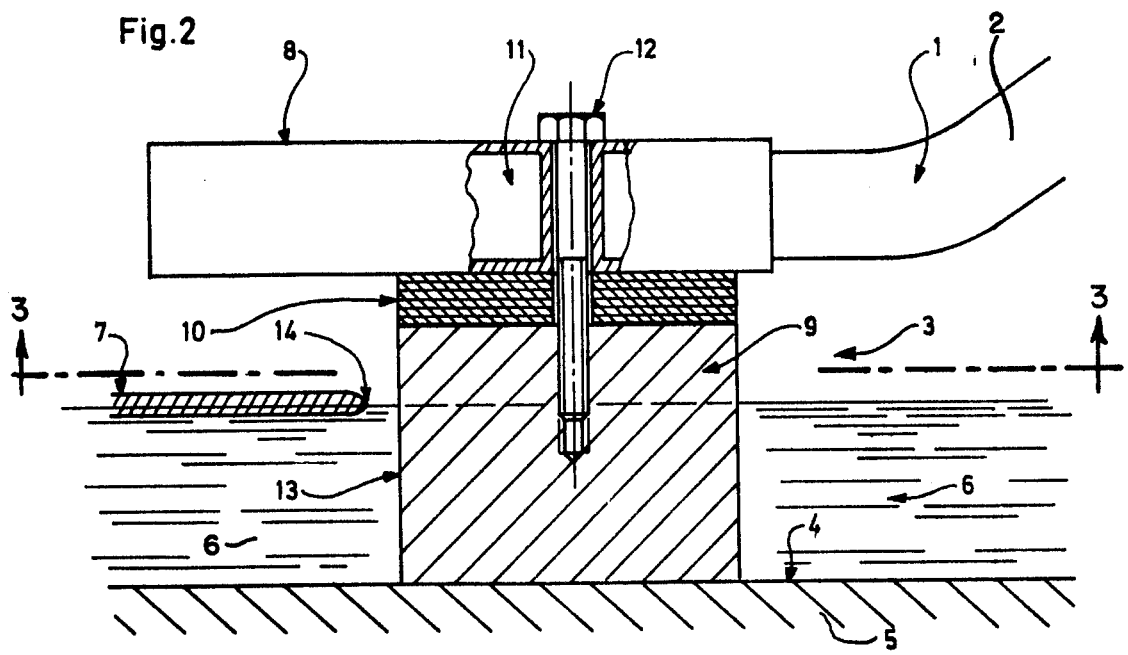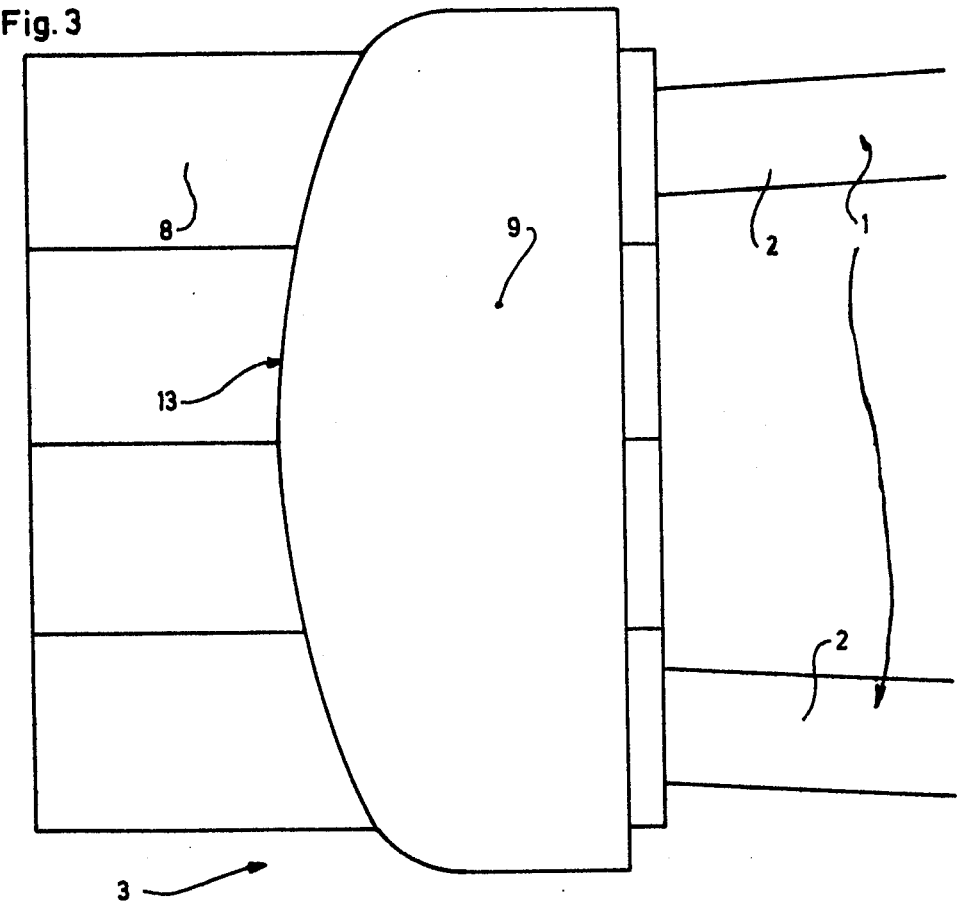

METHOD AND APPARATUS FOR MANUFACTURING GLASS RIBBON ON A BATH OF MOLTEN METAL

BACKGROUND OF THE INVENTION

1. Field of the Invention

This invention relates to the manufacture of glass ribbon by the flotation process.

2. Description of the Prior Art

In the flotation process for manufacturing glass ribbon, a thick layer of molten glass is poured onto a bath of molten metal. Because the density of the molten glass is less than that of the molten metal, it floats upon the molten metal bath. The glass is caused to advance along the length of the molten metal bath and is also permitted to flow freely in a lateral direction so that the thickness of the advancing molten glass is gradually reduced. The molten glass naturally acquires a thickness of approximately 6 mm due to the effect of gravitational forces and of the interfacial tension between the glass layer and the molten metal bath. The naturally acquired thickness of the glass ribbon is customarily described as its equilibrium thickness.

As the molten glass advances along the length of the molten metal bath, the glass is gradually cooled to form a flat, congealed glass ribbon floating upon the molten metal bath. Knurled extraction rollers facilitate the forward motion of the glass ribbon and draw the relatively cool glass ribbon from the molten metal bath. The extraction rollers also assist in the manufacture of glass ribbon having a thickness less than the equilibrium thickness. By adjusting the rate of rotation of the extraction rollers, traction forces exerted by the rollers upon the glass ribbon may be increased so as to stretch the glass ribbon to a thickness of approximately 2 mm.

With the flotation process, it is also possible to manufacture glass ribbon having a thickness greater than the equilibrium thickness. Molten glass is poured onto the molten metal bath but the molten glass is physically prevented from outwardly spreading to its equilibrium thickness. When the molten glass has reached a desired thickness, its lateral spreading is halted by a series of barriers positioned within the molten metal bath along both sides of the advancing glass ribbon. The edges of the continuously advancing ribbon of glass slide along these barriers. To reduce the adherence of the molten glass to the barriers, a non-wettable material such as carbon or graphite is used to form the barriers. By preventing the lateral spreading of the molten glass as well as regulating the rate of addition of molten glass to the molten metal bath and the rate of advance of the glass ribbon, it is possible to manufacture glass ribbon having a thickness ranging from approximately 7 to 20 mm.

As the hot molten glass is poured into the molten metal bath, heat is transferred from the molten glass to the bath; and the central region of the bath tends to become considerably hotter than the sides of the bath. It is desirable to reduce the thermal gradient thus formed across the molten metal bath to ensure that the glass ribbon floating upon the molten metal bath has flat, parallel surfaces. To equalize the temperature across the molten metal bath and to minimize the effect of processing asymmetries, it is known to create transverse convection currents of molten metal beneath the glass ribbon and to direct these currents toward the edges of the glass ribbon, thereby producing a thermosiphon.

In the prior art, non-wettable cooling members positioned within the molten metal bath on either side of the edges of the glass ribbon are used to create the above described transverse convection currents. Since the local transverse flow of molten metal drives the glass ribbon to the corresponding side of the molten metal bath, the cooling members must also serve as thrust bearings which exert a lateral thrust on the edge of the glass ribbon which contacts the cooling member.

As indicated in French Pat. No. 1,535,007, the cooling members may be cooled internally by the circulation of a cooling fluid. This internal circulation assists in preventing the edges of the glass ribbon from adhering to the contacted cooling member.

Th prior art cooling members have several limitations. For example, since these internally cooled members are immersed within the molten metal bath, they substantially cool the side areas of the bath. As previously indicated, these side regions have a natural tendency to be cooler than the central region of the bath. The thermal gradient across the molten metal bath is thus increased by the prior art cooling members. As a result, the glass ribbon will not have flat parallel surfaces. The increased thermal gradient also enhances the undesirable tendency of the glass ribbon to divert toward the relatively cold side regions of the molten metal bath and contact the cooling members.

Although the lower surface of the prior art cooling members may be thermally insulated from the bath of molten metal, the bath is substantially cooled by even the small uninsulated portion of the side walls of the cooling members which extend into the molten metal bath.

SUMMARY OF THE INVENTION

We have invented a method and apparatus for manufacturing glass ribbon which guides the glass ribbon along the molten metal bath without cooling the bath.

This invention provides an improved method and apparatus for manufacturing a glass ribbon. As in the prior art, molten glass is poured onto a bath of molten metal and advanced along the molten metal bath so as to form a glass ribbon. The method further includes guiding and simultaneously cooling the edges of the glass ribbon as the glass ribbon advances along the molten metal bath, while maintaining the guiding means at a higher temperature than the cooling means.

The apparatus comprises a tank containing a bath of molten metal on which is poured molten glass to form a glass ribbon. A guide member is positioned within the tank along both edges of the glass ribbon. The lower portion of the guide member is made of a non-wettable material and has thrusting means such as a thrust bearing for thrusting the glass ribbon contacting the guide member in a direction generally transverse to the axis of the glass ribbon. The upper portion of the guide member has cooling means such as an internally cooled member or cooling gas for cooling the edges of the glass ribbon. The cooling means is separated from the thrusting means above the surface of the molten metal bath by a thermal insulating means such as a thermal insulating screen. The thermal insulating means prevents the cooling means from cooling the thrusting means.

In an embodiment of the present invention, the cooling means comprises a member having a cavity positioned over the edge of the glass ribbon and means for circulating a cooling fluid through the cavity so as to cool the edge of the glass ribbon. The thrust bearing may have a generally convex horizontal cross section adjacent the edge of the glass ribbon.

In another embodiment of the invention, the thrusting means may comprise a rotating thrust bearing having a generally vertical axis of rotation. The thrust bearing is rotated by a turbine means such as a turbine having rotatable blades which are driven by pressurized gas feed means. Illustratively, the gas feed means is a pipe having a nozzle and supplied with pressurized gas. The edge of the glass ribbon is simultaneously cooled by the gas feed means as the latter drives the turbine. The rotating thrust bearing is separated from the turbine by an insulating screen which prevents the thrust bearing from being cooled by the pressurized gas feed means.

The periphery of the stationary or rotating-thrust bearing which comes into contact with the edge of the glass ribbon may be at least partially inclined with respect to the surface of the glass ribbon so that the width of the thrust bearing decreases toward the bottom of the tank.

BRIEF DESCRIPTION OF THE DRAWINGS

Preferred embodiments of the invention are described hereinbelow with reference to the drawings wherein:

FIG. 2 is an enlarged sectional view of the guide member of FIG. 1;

FIG. 3 is a sectional view taken along line 3—3 of FIG. 2;

DETAILED DESCRIPTION OF THE PREFERRED EMBODIMENTS

Figure 1:
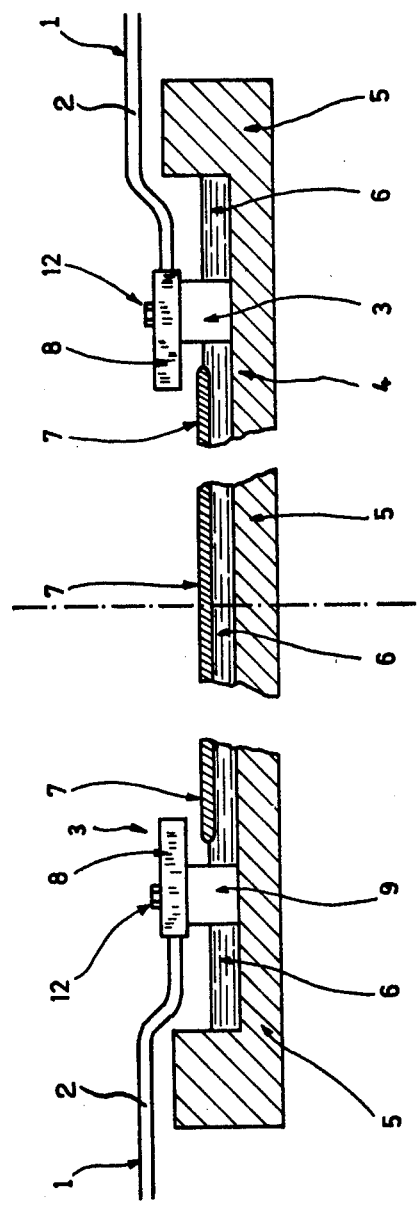
FIG. 1 is an elevational, transverse view of a flotation apparatus and a guide member according to the present invention.

FIG. 1 is a cross sectional view of an illustrative apparatus for producing a glass ribbon by the flotation process. The apparatus comprises a tank 5 and two guide members 3 on either side of a glass ribbon 7 which floats on a molten metal bath 6. The section of FIG. 1 is transverse to the longitudinal axis of tank 5 along which axis the glass ribbon is guided by members 3 during the manufacture of a glass sheet. Tank 5 is made of fire-resistant materials and molten metal bath 6 consists of a molten metal having high thermal conductivity, such as tin. Metal bath 6 is shielded by a protective atmosphere which is not shown in FIG. 1. Stationary guide members 3 have an upper portion 8 which projects above the edge of glass ribbon 7 and a lower portion 9 which is immersed in molten metal bath 6.

FIG. 2 is an enlarged view of guide member 3 showing upper portion 8 and lower portion 9 separated by a thermal insulating screen 10. Screw 12 rigidly secures the upper and lower portions of guide member 3 to thermal insulating screen 10 to form a single structure. Upper portion 8 of guide member 3 has an internal cavity 11 that communicates with a rigid, insulated arm 1 formed by two parallel tubes 2 (only one tube is visible in FIG. 2). Internal cavity 11 is positioned above edge 14 of glass ribbon 7. To cool upper portion 8 of guide member 3, cooling fluid is circulated through cavity 11 by insulated tubes 2. Lower portion 9 of guide member 3 is a thrust bearing which is immersed within molten metal bath 6. The thrust bearing is made of a nonwettable material such as graphite so as to improve the gliding of edge 14 of glass ribbon 7 along its side wall 13. Thermal insulating screen 10 may be made of a fibrous heat-resisting material such as SYNDANIO manufactured by T.A.C. Manchester, United Kingdom. Illustratively guide members 3 are mounted on the bottom 4 of tank 5 but they could be maintained by arm 1 a predetermined distance above bottom 4.

FIG. 3 is a horizontal sectional view of guide member 3 of FIG. 2. Upper portion 8 of guide member 3 is shown communicating with two parallel tubes 2 of arm 1. Side wall 13 of thrust bearing 9 illustratively has a convex curvature along its horizontal cross section. For clarity, screw 12 has been omitted from FIG. 3.

Referring to FIGS. 1-3, a sheet of glass is made by pouring molten glass onto molten metal bath 6. The molten glass floats on molten metal bath 6 and advances along the length of tank 5. As it proceeds, it is gradually cooled to form a flat glass ribbon 7.

Guide members 3 are positioned several centimeters beyond the desired width of glass ribbon 7; and, in theory, glass ribbon 7 advances along tank 5 without contacting them. However, thermal asymmetries occur along the length of the tank which may cause the ribbon to contact the guide members. For example, lateral asymmetries may cause a side region of molten metal bath 6 to be cooler than an opposite side region with the result that the glass ribbon is diverted toward the cooler side region of molten metal bath 6 as it advances. In such a case, edge 14 of glass ribbon 7 contacts side wall 13 of thrust bearing 9. The latter halts the outward lateral motion of glass ribbon 7 and exerts a thrust upon contacting edge 14 of glass ribbon 7 in a direction perpendicular to the longitudinal axis of glass ribbon 7, thereby redirecting glass ribbon 7 toward the center of tank 5.

Since thrust bearing 9 is made of a non-wettable material, the adherence of glass ribbon 7 to side wall 13 of thrust bearing 9 is advantageously minimized. Further, the convex curvature of side wall 13 further diminishes the risk of adherence of glass ribbon 7 to side wall 13 by reducing the amount of surface area of side wall 13 which actually comes in contact with the edge 14 of glass ribbon 7.

In addition to its thrusting action, guide member 3 also cools the edges of glass ribbon 7. Upper portion 8 of guide member 3, which extends above the edge of glass ribbon 7, is cooled by the circulation of cooling fluid throughout cavity 11. In turn, cooled upper portion 8 absorbs the thermal energy radiated by edge 14 of glass ribbon 7 so as to reduce the temperature of edge 14. The cooling of edge 14 of glass ribbon 7 increases its viscosity. When edge 14 contacts thrust bearing 3, the edge is thus sufficiently stiffened so as not to stick to the thrust bearing 9. Since the glass ribbon is opaque to infrared thermal radiation emitted by the molten metal bath, heat radiated from molten metal does not pass through glass ribbon 7 to the cooled upper portion 8 of guide member 3. Thus, glass surface 7 acts as a shield which prevents the refrigerated upper portion 8 of guide member 3 from absorbing the heat emitted by the molten metal bath and thereby reducing the temperature of the bath.

Figure 4:
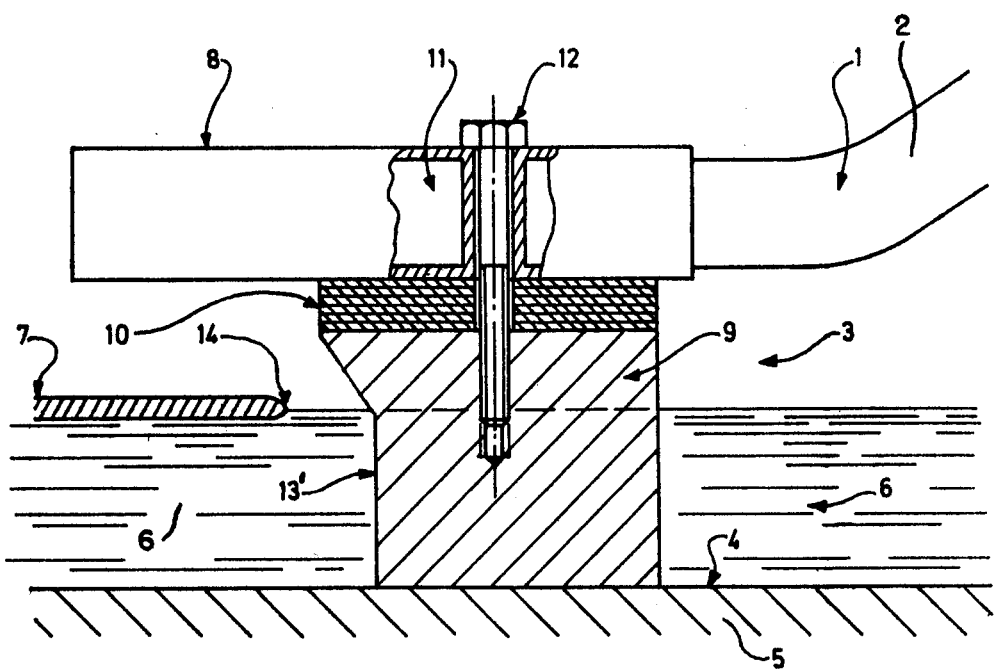
FIG. 4 is sectional view of an alternate embodiment of a guide member according to the present invention.

FIG. 4 illustrates an additional embodiment of a guide member according to the present invention. Thrust bearing 3 of FIG. 4 is identical to the thrust bearing illustrated in FIG. 2 except that side wall 13' of guide member 3 of FIG. 4 is inclined above the surface of molten metal bath 6. Inclined side wall 13' forms an angle of approximately 60° with respect to the surface of glass ribbon 7. Side wall 13' still may have a convex curvature as illustrated in FIG. 3.

Due to the inclination of side wall 13', only the upper portion of edge 14 of glass ribbon 7 contacts thrust bearing 9. Consequently, the area of edge 14 which contacts thrust bearing 9 is reduced by this configuration and the risk of adherence of edge 14 of glass ribbon 7 to thrust bearing 9 is correspondingly minimized.

Figure 5:
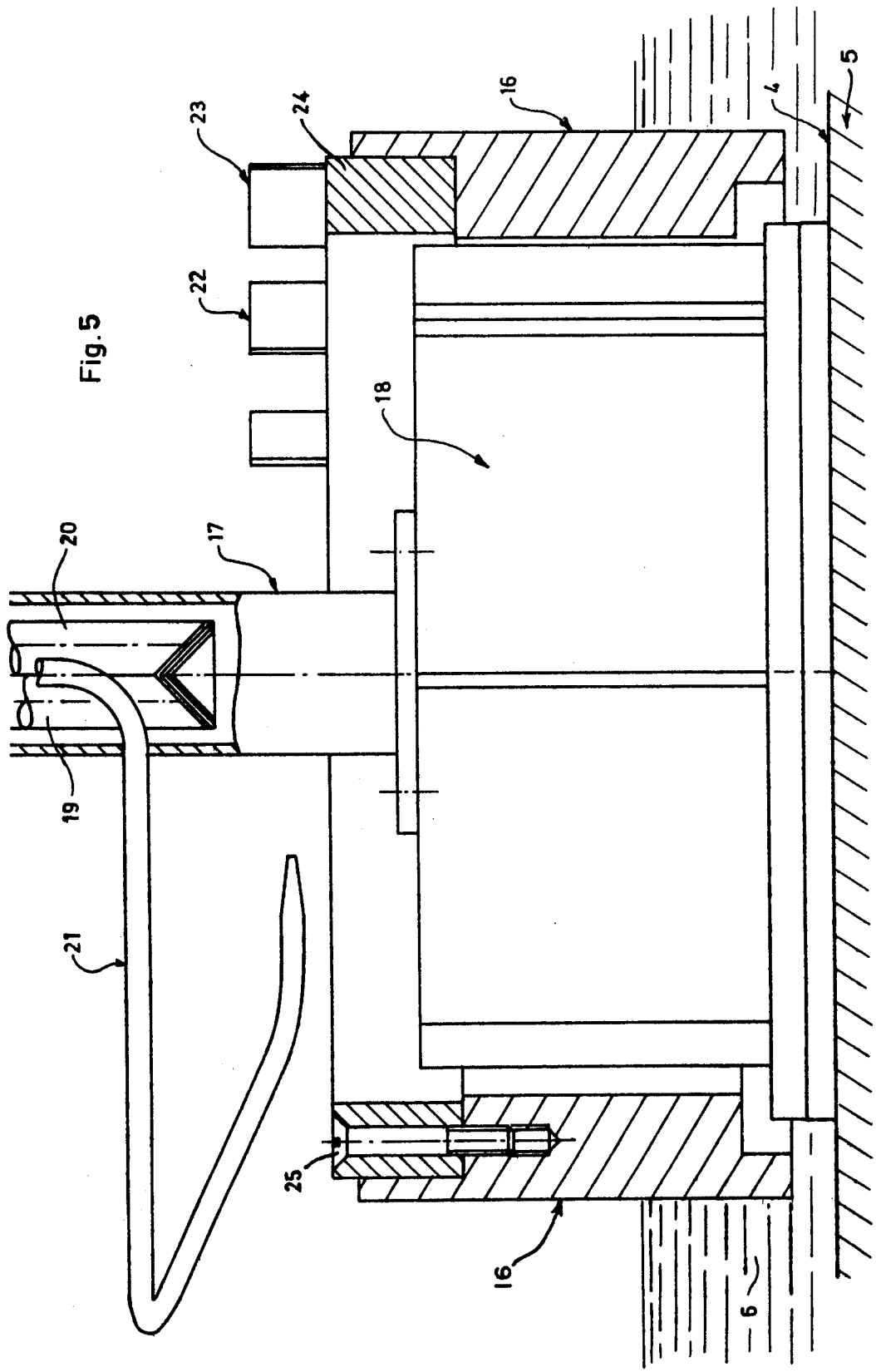
FIG. 5 is a sectional view of another embodiment of a guide member according to the present invention.
Figure 6:
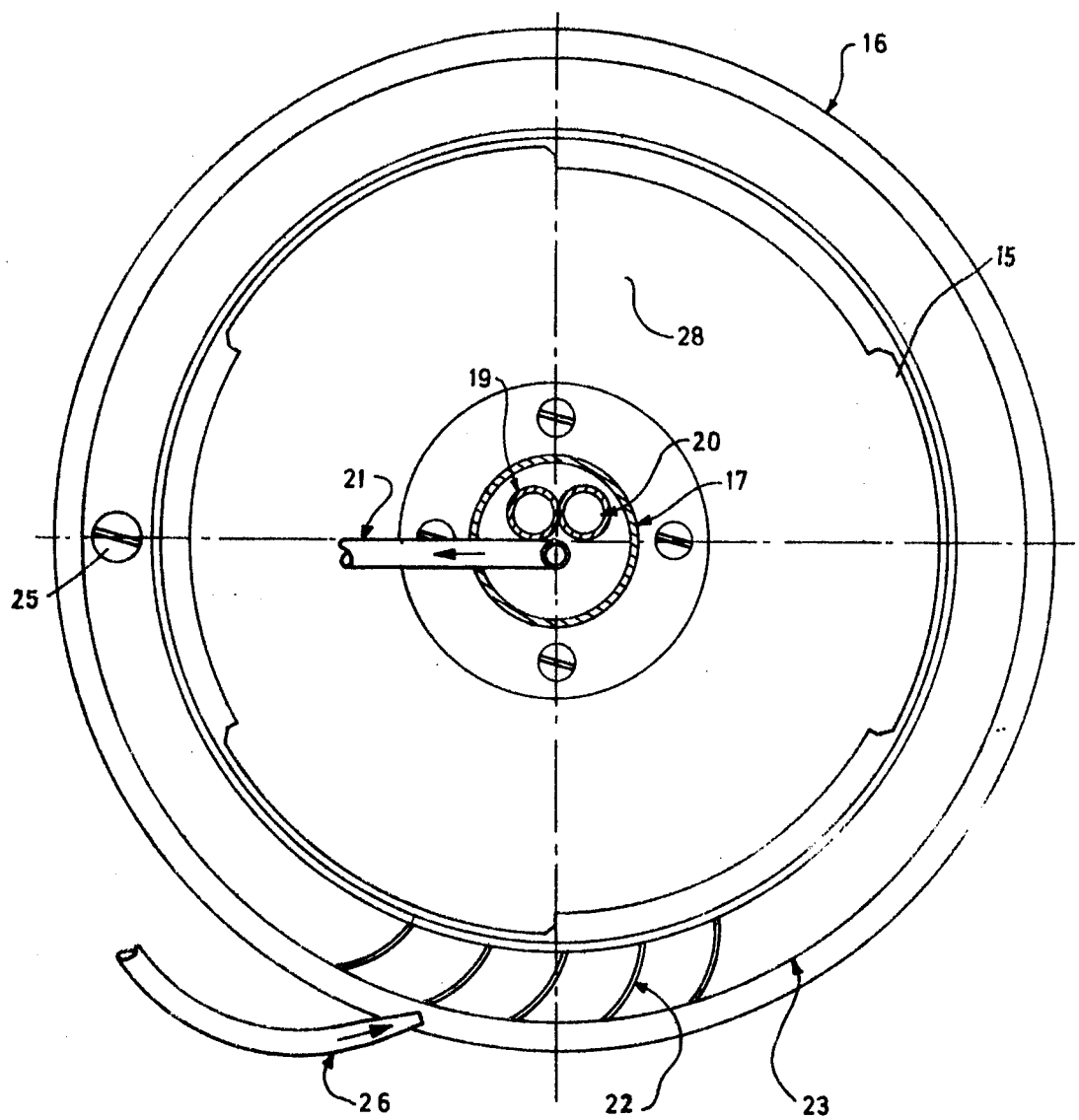
FIG. 6 is a plan view of the guide member of FIG. 5.

To further reduce the adherence of the edge of glass ribbon 7 to the guide member, the lower portion of the guide member may be a revolving thrust bearing rotation about a vertical axis. Such an embodiment of the present invention is illustrated by FIGS. 5 and 6. A guide member is shown having a cylindrical roller 16, bearings 15, a graphite hub 18, a hollow shaft 17 and a turbine 23. Cylindrical roller 16 is a right circular cylinder immersed within molten metal bath 6. Roller 16 illustratively rotates on three bearings 15 of graphite hub 18. As shown, hub 18 contacts bottom 4 of tank 5 but alternatively it can be maintained by arm 1 a short distance from bottom 4. The upper portion of hub 18 is mounted on the lower end of hollow shaft 17 which in turn is connected to rigid arm 1 (not shown in FIGS. 5 and 6). Hollow shaft 17 surrounds tubes 19, 20 and 21. Tubes 19 and 20 are utilized to refrigerate the shaft while tube 21 is a pressurized gas feeding pipe.

As shown, blades 22 of turbine 23 are positioned around hollow shaft 17 and mounted on an insulating crown 24 on roller 16. The crown, which separates turbine 23 from roller 16, is held in place on roller 16 by a screw 25. Gas is forced through tube 21 and out nozzle 26 to drive turbine blades 22 and thereby rotate cylinder 16. The pressurized gas of tube 21 is illustratively nitrogen but may be a mixture of nitrogen and hydrogen. Such a mixture is the same as the protective reducing atmosphere that covers the surface of the molten metal bath. The rotation of roller 16 decreases the contact time between the edges of glass ribbon 7 and roller 16. Therefore, the glass ribbon is less likely to adhere to the walls of roller 16.

After the pressurized gas has rotated turbine blades 22, the gas may advantageously pass above the edge of glass ribbon 7 and further cool this edge.

In an alternate embodiment of the present invention, cylinder 16 may have an outwardly inclining surface above the surface of molten metal bath 6. As noted in the discussion of FIG. 4, this inclination reduces the risk of adherence of the glass ribbon to cylinder 16.

Figure 7:
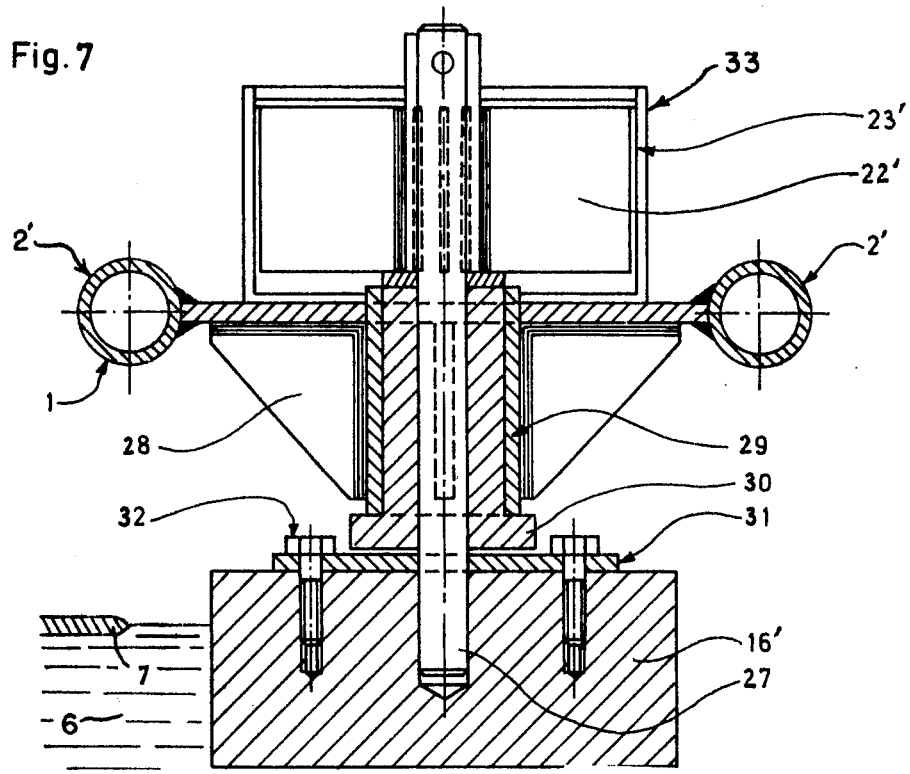
FIG. 7 is a sectional view taken along line A—A of FIG. 8.
Figure 8:
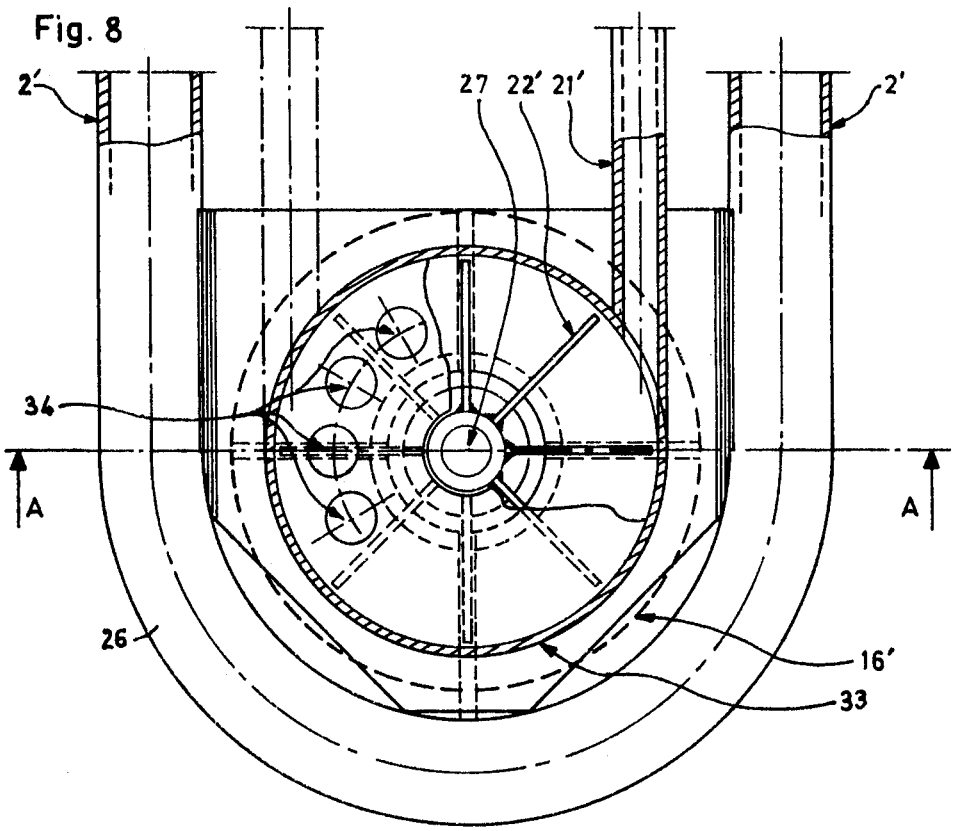
FIG. 8 is a sectional view of yet another guide member according to the present invention.

FIGS. 7 and 8 illustrate another embodiment of the guide member which improves the cooling of the edge of the glass ribbon. A guide member is shown having a turbine 23', a cooling tube 2', a shaft 27 and a rotating cylinder 16'. Turbine 23' has rotatable blades 22' which are surrounded by a housing 33 mounted on the upper end of shaft 27. While housing 33 is integral with frame 28, the blades are rigidly connected to shaft 27. Hub 29 of frame 28 surrounds shaft 27. The lower portion of shaft 27 is rigidly connected to graphite roller 16' by means of a flange 31 and screws 32. A graphite sleeve 30 positioned between the lower end of hub 29 and the upper surface of flange 31 acts as a bearing block for shaft 27. Roller 16' thus does not undergo any direct cooling.

When blades 22' are rotated by the action of pressurized gas fed through pipe 21', shaft 27 rotates. In turn, shaft 27 rotates roller 16'. As previously indicated, the rotation of roller 16' reduces the contact time between the edge of glass ribbon 7 and roller 16'. The risk of glass adhering to the roller is thereby reduced.

Additionally, housing 33 has apertures 34 located at its base plate. The pressurized gas which activates turbine 23' passes through apertures 34 and cools the edge of glass ribbon 7.

To further cool the edge of glass ribbon 7 and thereby reduce the adherence of the ribbon to roller 16', cooling tube 2' is positioned above the glass ribbon edge. Frame 28 of the guide member supports tube 2'. Illustratively, tube 2' surrounds the guide member. Cooled fluid passes through tube 2' and absorbs the thermal energy radiated by the edge of glass ribbon 7. The temperature of the glass ribbon is substantially reduced, improving the gliding of glass ribbon 7 along the guide member.

While the invention has been described in conjunction with certain embodiments thereof it is to be understood that various modifications and changes may be made without departing from the spirit and scope of the invention.

We claim:

1. An apparatus for manufacturing glass ribbon comprising in combination:
    (a) a tank containing a bath of molten metal on which is poured molten glass to form a glass ribbon; and
    (b) a guide member disposed interior of side walls of the tank along opposite edges of the glass ribbon, a lower portion of said guide member being made of a non-wettable material and having means for thrusting the glass ribbon contacting the guide member in a direction generally transverse to the axis of the glass ribbon, said means for thrusting the glass ribbon being rotatable about a vertical axis, an upper portion of said guide member having means for cooling the edges of the glass ribbon, said cooling means being separated from said rotatable thrusting means above the surface of the molten metal bath by a thermal insulating means which prevents the cooling means from cooling the thrusting means.

2. The apparatus according to claim 1 wherein the cooling means comprises a member having a cavity positioned over the edge of the glass ribbon and means for circulating a cooling fluid through said cavity so as to cool the edge of the glass ribbon.

3. The apparatus according to claim 2 wherein the thrusting means is a thrust bearing and the thermal insulating means comprises a thermally insulating screen which insulates the thrust bearing from the cooling means.

4. The apparatus according to claim 3 wherein the thrust bearing has a generally convex horizontal cross section adjacent the edge of the glass ribbon.

5. The apparatus according to claim 1 wherein the cooling means comprises a member having a cavity positioned over the edge of the glass ribbon, and further includes means for circulating a cooling fluid to said cavity so as to cool the edge of the glass and the thrusting means comprises a thrust bearing having a side adjacent the glass ribbon which is at least partially inclined with respect to the surface of the glass ribbon.

6. The apparatus according to claim 5 wherein the inclined side of the thrust bearing is at an angle of approximately 60° with respect to the surface of the glass ribbon.

7. The apparatus according to claim 1 wherein the thermal insulating means comprises a thermal insulating screen which insulates the thrust bearing from the cooling means, said screen being positioned above the upper surface of the glass ribbon.

8. The apparatus according to claim 1 wherein the thrusting means comprises a rotating thrust bearing having a generally vertical axis of rotation, the cooling means comprises a turbine means for rotating the thrust bearing and pressurized gas feed means for driving the turbine means and for simultaneously cooling the edge of the glass ribbon.

9. The apparatus according to claim 8 wherein the thermal insulating means comprises an insulating crown which insulates the rotating thrust bearing from both the turbine means and the gas feed means.

10. The apparatus according to claim 9 wherein the cooling means comprises a conduit positioned over the edge of the glass ribbon and means for circulating a cooling fluid through said conduit so as to cool the edge of the glass ribbon.

11. The apparatus according to claim 9 wherein the periphery of the rotating thrust bearing is inclined so that the width of the thrust bearing decreases in a direction toward the bottom of the tank.

12. The apparatus according to claim 1 wherein the thrusting means is mounted on the bottom of the tank.

13. A method for manufacturing a glass ribbon comprising:
 (a) directing molten glass onto a bath of molten metal;
 (b) advancing the molten glass along the molten metal bath so as to form a glass ribbon;
 (c) guiding and simultaneously cooling the edges of the glass ribbon as the glass ribbon advances along the molten metal bath, the glass ribbon being guided by rotatable means disposed about a vertical axis for thrusting the glass ribbon in a direction generally transverse to the advancing flow of the glass ribbon and the cooling being performed by cooling means positioned above the glass ribbon, said thrusting means and cooling means being parts of a single structure disposed interior of side walls of the bath along opposite edges of the glass ribbon; and
 (d) thermal insulating the thrusting means from said cooling means.

14. The method according to claim 13 further comprising rotating the thrusting means about a vertical axis while simultaneously cooling the edges of the glass ribbon as the glass ribbon advances along the molten metal bath.

15. The method according to claim 14 wherein the step of rotating the thrusting means comprises driving a turbine means having rotatable blades by forcing gas onto the blades, the turbine means being secured to the thrusting means so as to rotate the thrusting means.

* * * * *

UNITED STATES PATENT AND TRADEMARK OFFICE
CERTIFICATE OF CORRECTION

PATENT NO. : 4,093,439
DATED : June 6, 1978
INVENTOR(S) : Jean-Claude Coulon and Piero Ammannati It is certified that error appears in the above–identified patent and that said Letters Patent are hereby corrected as shown below:

Column 5, lines 18 and 19, "rotation" should be
-- rotating --;

Abstract page, "Amannati" should be -- Ammannati --.

Signed and Sealed this

Fourteenth Day of November 1978

[SEAL]

Attest:

RUTH C. MASON
Attesting Officer

DONALD W. BANNER
Commissioner of Patents and Trademarks